United States Patent [19]

Cooper

[11] Patent Number: 5,006,235

[45] Date of Patent: Apr. 9, 1991

[54] BARRIER FLANGE FILTER ASSEMBLY INCLUDING COVER

[75] Inventor: Roydon B. Cooper, Locust Valley, N.Y.

[73] Assignee: Pall Corporation, Glen Cove, N.Y.

[21] Appl. No.: 841,614

[22] Filed: Mar. 20, 1986

[51] Int. Cl.$^5$ .................... B01D 27/06; B01D 27/08
[52] U.S. Cl. .................................. 210/136; 210/137;
210/232; 210/420; 210/456; 210/485;
210/493.2; 55/461; 55/498; 55/502; 55/503;
55/521
[58] Field of Search ................ 210/137, 173, 384, 402,
210/456, 497.3, 497.4, 494.1, 494.2, 440, 443,
444, 136, 130, 450, 420, 484, 485, 493.2, 497.01,
497.2; 55/461, 498, 502, 503, 521

[56] References Cited

U.S. PATENT DOCUMENTS

| Re. 30,779 | 10/1981 | Cooper | 210/232 |
| 3,908,693 | 9/1975 | Cooper | 137/493 |
| 4,279,746 | 7/1981 | Leutz | 210/130 |
| 4,299,696 | 11/1981 | Rosaen et al. | 210/120 |

FOREIGN PATENT DOCUMENTS 2056298  3/1981  United Kingdom .
2057285  4/1981  United Kingdom .
1589235  5/1981  United Kingdom .

Primary Examiner—Richard V. Fisher
Assistant Examiner—Wanda L. Millard
Attorney, Agent, or Firm—Leydig, Voit & Mayer

[57] ABSTRACT

The disclosure describes a filter assembly comprising a housing, a cover, a barrier flange, a flow tube, and a filter unit. The housing has an opening and the cover is detachably and sealingly mounted to the housing at one end of the opening. The barrier flange is detachably and sealingly mounted to the housing within the opening and has upstream and downstream sides and an aperture extending therebetween. The housing further has at least one port which communicates with the opening between the cover and the barrier flange. The flow tube has first and second ends. It is joined at the first to the cover and extends through the aperture and the barrier flange and is joined to the barrier flange. The flow tube also includes at least one orifice between the barrier flange and the cover. The filter unit is mounted to the second end of the flow tube and includes a hollow cylindrical filter element and first and second impervious end caps, the flow tube communicating with the interior of the filter element via an aperture in the first end cap.

28 Claims, 3 Drawing Sheets

BARRIER FLANGE FILTER ASSEMBLY INCLUDING COVER

TECHNICAL FIELD

The present invention relates to filter assemblies and, in particular, to filter assemblies which may be designed for inside-out flow.

BACKGROUND ART

Many conventional filter assemblies include a hollow, cylindrical filter which comprises a cylindrical, pleated filter medium sandwiched between and bonded to impervious end caps. At least one of the end caps has a central aperture through which a fluid line communicates with the interior of the filter. Fluid to be filtered is directed through the filter medium from the outside to the inside and the filtered fluid is then removed from the interior of the filter via the fluid line.

As the fluid flows outside-in through the filter, contaminants, such as particulates, accumulate on the outside surface of the filter medium. Once a sufficient accumulation of contaminants has caked onto the outside surface of the filter medium, flow through the filter is significantly impeded. At this point, the filter should be removed from the filter assembly and replaced with a new filter. Unfortunately, with the accumulation of contaminants caked on the outside of the filter medium, removing and replacing the filter can result in the release of some of the accumulated contaminants. These contaminants can then re-enter the system fluid and cause severe wear or other related problems.

A filter assembly having a filter with one closed end cap allows the fluid to be filtered to be directed from the inside-out and significantly diminishes this problem. The contaminants accumulate on the inside surface of the filter medium and therefore are contained within the filter by the medium and closed end cap. Consequently, the filter may be removed and replaced conveniently without release of the accumulated contaminants trapped inside the filter.

Unfortunately, conventional filter assemblies designed for inside-out have several additional drawbacks. For example, in order to force fluid through the filter, the pressure of the fluid inside the filter must be greater than the pressure of the fluid outside the filter. This difference in pressure forces the end caps away from the filter medium. If the force becomes great enough, the bond between the end caps and the filter medium can rupture, causing contaminated fluid to bypass the filter medium. Because of this force, conventional filter assemblies frequently use two open end caps with compression seals and/or an auxiliary spring force to help keep the filter in compression to prevent rupture of the end cap bonds. However, the open end caps will not contain the accumulated contaminant on the inside of the filter.

Inside-out flow is also more likely to stretch and misshape the pleats of the filter medium than outside-in flow. Misshaping the element modifies its porous characteristics, making it useless long before rupture occurs. Further, both of these problems, i.e, rupture of the end cap bonds and misshaping of the element, are heightened by flow disturbances, such as flow surges, which may typically be encountered by the filter assembly.

DISCLOSURE OF THE INVENTION

To overcome these and other drawbacks of conventional filter assemblies, the present invention provides a filter assembly generally comprising a housing, a cover, a barrier flange, a flow tube, and a filter unit. The housing has an opening which extends into the housing and the cover is detachably mounted to the housing at one end of the opening, sealing that end of the opening. The barrier flange, which may, for example, comprise a metal plate, is detachably mounted to the housing within the opening. The barrier flange has an upstream side and a downstream side, and an aperture extends through the barrier flange from the upstream side to the downstream side. The flow tube has two ends and is joined at one end to the cover. The flow tube, which extends from the cover through the aperture in the barrier flange, is also joined to the barrier flange. The filter unit is mounted to the other end of the flow tube and includes a hollow cylindrical filter element with an end cap on each end of the filter element. One of the end caps has an aperture which allows the flow tube to communicate with the interior of the hollow filter element. To allow fluid flow through the filter assembly, the housing includes at least one port which communicates with the opening in the housing between the cover and the barrier flange, and the flow tube includes at least one orifice between the barrier flange and the cover. Further, the barrier flange is smaller than the cover; the filter unit is smaller than the barrier flange; and the cover, barrier flange, and filter unit are coaxially joined to the flow tube. Consequently, the filter unit may be withdrawn through the opening in the housing by simply removing the cover.

The filter assembly according to this aspect of the present invention may advantageously, but need not necessarily, be designed for fluid flow from the inside of the filter unit to the outside of the filter unit. Fluid would enter the housing through the port and then pass into the opening, through the orifice in the flow tube, along the flow tube, through the aperture in the end cap, and into the interior of the filter unit. The fluid would then flow inside-out through the filter element, leaving any contaminants trapped within the interior of the filter unit.

The present invention also provides a filter assembly generally comprising a hollow, cylindrical filter element, an end cap, a support, an end closure, and a fluid-channeling structure. The filter element includes a porous filter medium. The end cap is mounted to one of the filter element, and the support is disposed near the end cap. The other end of the filter element is enclosed by the end closure, which has an inlet aperture communicating with the interior of the hollow filter element. The fluid-channeling structure channels fluid through the aperture of the end closure into the interior of the filter element. The end closure, which engages an slides along the channeling structure, also have one surface in contact with the fluid to be filtered and facing away from the filter element and another surface in contact with the fluid to be filtered facing toward the filter element, the first surface being larger than the second surface.

The filter assembly according to this aspect of the present invention prevents rupture of the bonds between the end cap or end closure and the filter element. Since the first surface of the end closure is larger than the second surface, the end closure, filter element, and end cap are forced to slide along the channeling structure until the end cap contacts the support where the end closure and the end cap are then compressed against the filter element.

The present invention also provides a filter unit generally comprising a hollow, cylindrical filter element, a perforated support, and first and second end caps. The filter element includes a porous filter medium which comprises several adjacent, self-supporting pleats. Each pleat has a generally U-shaped groove which includes a loose fold and two webs extending from the loose fold and terminating at the open end of the U-shaped groove. The pleats are arranged with one web of each pleat adjoining one web of an adjacent pleat, the adjoining webs joined by a tight fold. The pleats are axially aligned with the open ends of the pleats disposed upstream from the loose folds of the pleats. The perforated support is disposed adjacent the pleated filter medium downstream from the first folds.

The filter unit according to this aspect of the present invention resists misshaping of the pleated filter medium. Consequently, it maintains its integrity and effectiveness even when used for inside-out fluid flow at high differential pressures.

The present invention further provides a filter assembly cover removably mountable to the housing of the filter assembly. The cover generally comprises a body, a fulcrum, several purchases, and a threaded portion for joining the cover to the housing. The body includes a base and an annular rim which extends away from the base and terminates in an outer edge which defines a plane. The fulcrum extends from the base in the same direction as and coaxially with the rim. The purchases include a predetermined number of protrusions which extend from and are evenly distributed about the inside surface of the rim below the plane.

The cover, according to this aspect of the present invention, may be conveniently and effectively tightened to or loosened from the housing by a simple lever, such as a screwdriver. In a preferred embodiment, the fulcrum comprises a post with a hexagonal cross-section while the purchases comprise six protrusions distributed evenly about the inside surface of the rim and extending from the inside surface toward the post. With this arrangement, the blade of the screwdriver may be placed against one of the protrusions while the shaft of the screwdriver is forced against the post, causing the cover to rotate. With the protrusions extending toward the post, the cover provides a low, compact profile.

The present invention still further provides a process for fashioning a pleated filter. The process comprises the steps of contacting a layer of a filter element and a layer of a filler to form a laminate, pleating the laminate, compressing the pleats of the laminate together in a direction perpendicular to the lines of the pleats, and then separating the filler from the filter element.

The process according to this aspect of the present invention yields a filter which is capable of withstanding the differential pressures which may be generated during inside-out fluid flow through the filter.

BEST MODE FOR CARRYING OUT THE INVENTION

Figure 1:
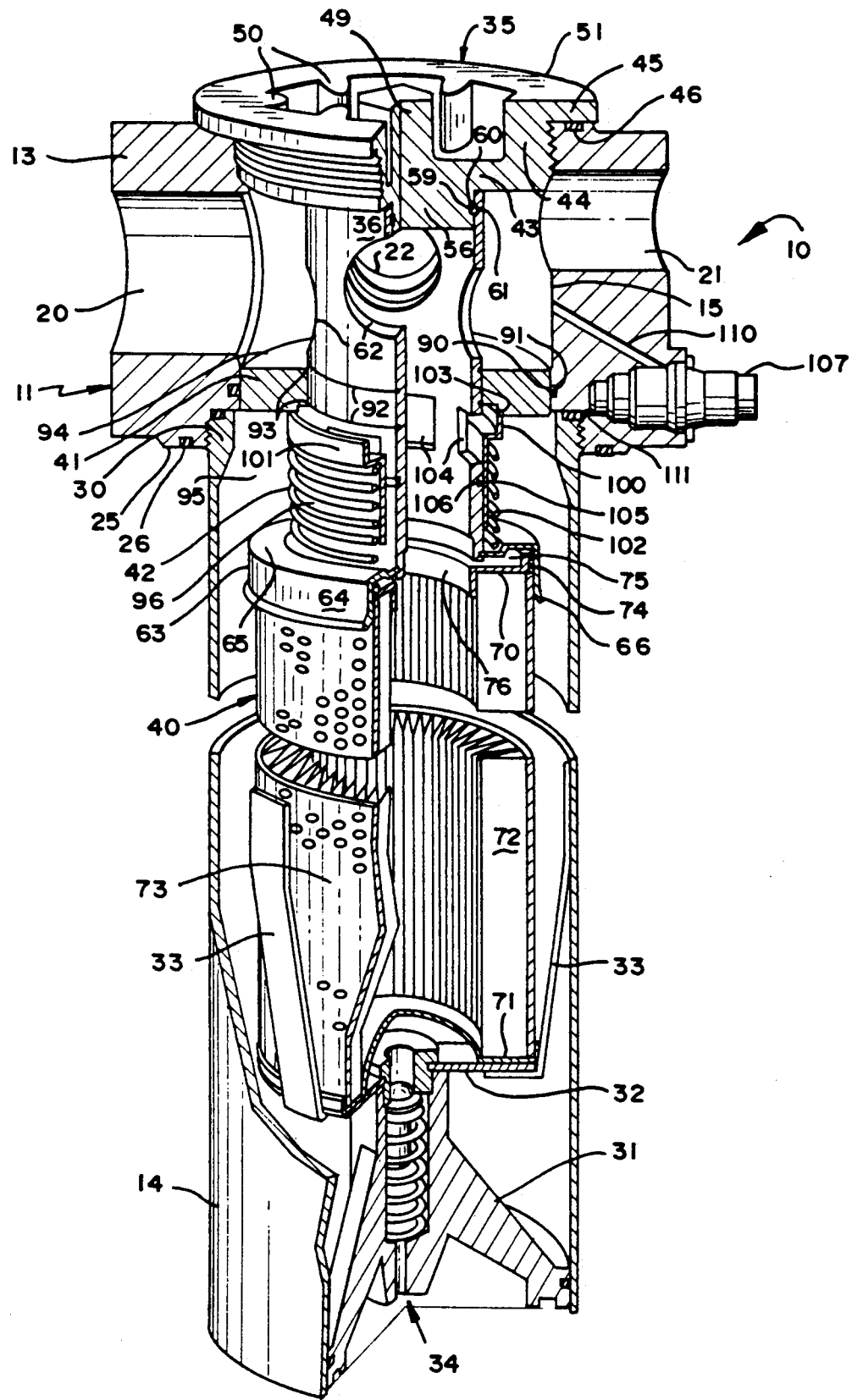
FIG. 1 is an isometric view of an exemplary filter assembly embodying the present invention.
Figure 2:
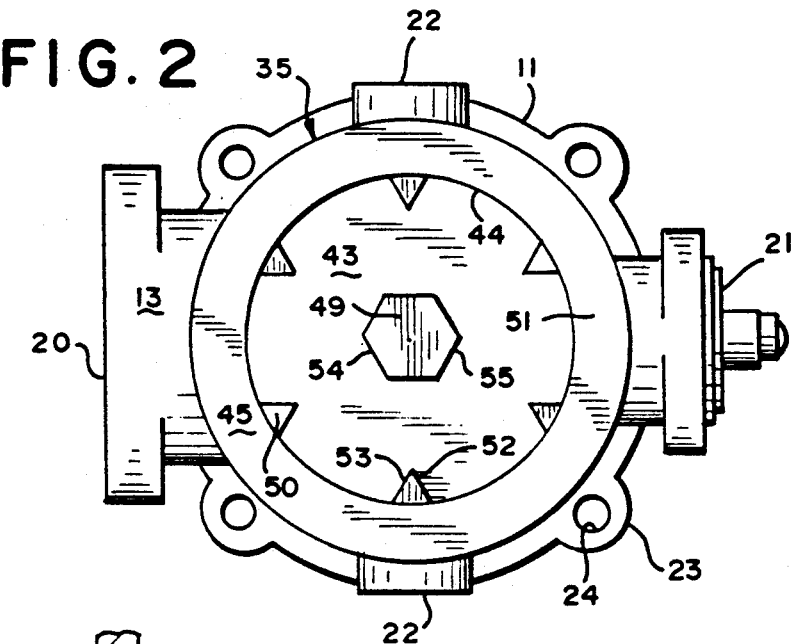
FIG. 2 is an plan view of the exemplary filter assembly of FIG. 1.

As shown in FIGS. 1 and 2, an exemplary filter assembly 10 embodying the present invention generally comprises a housing 11 and a filter module 12 removably mounted within the housing 11. In the preferred mode of operation, fluid is directed through the housing 11, passing inside-out through the filter module 12.

Although the housing may be variously configured, the housing 11 of the exemplary filter assembly 10 includes a head 13 and a cylindrical canister 14 joined to the head 13. The head 13 may be fashioned from any suitably rigid, impervious material compatible with the fluid being filtered, including, for example, cast iron. An opening or aperture 15 within which the filter module 12 may be inserted or withdrawn extends through the head 13. Primary, secondary, or even tertiary inlet ports 20, 21, 22 extend from the aperture 15 through the head 13 and may terminate in any suitable fitting which allows the head 13 to be coupled to a fluid line (not shown). In one contemplated application, the exemplary filter assembly 10 may be bolted to a separator plate (not shown) of an in-tank filter system. Consequently, the head 13 may further include several lobes 23 with holes 24 for receiving the bolts (not shown) and a facing surface 25 with a groove containing an O-ring 26 for sealing the head 13 to the separator plate.

The cylindrical canister 14 may be fashioned from any suitably rigid material also compatible with the fluid being filtered, including, for example, cold-rolled steel. The canister 14 may be removably joined to the head 13 by a threaded connector 30 or fixedly joined, for example, by swaging or welding. The canister 14 is joined to the head 13 at one end of the aperture 15 with the bore 31 of the canister 14 aligned and communicating with the aperture 15, forming an elongated aperture into which the filter module 12 extends. To guide the filter module 12 toward the center of the canister 14 and to limit the extension of the filter module 12 within the canister 14, a stop, such as a support plate 32, is concentrically mounted within the canister 14 by inwardly sloping guide members 33. Each guide member 33 is attached at one end to the support plate 32 and at the other end to the canister 14. The opposite end of the canister 14 may be open, closed with an outlet port (not shown), or, as shown in FIG. 1, may be enclosed by a check valve assembly 34 which permits fluid flow in a single direction through the filter module 12, e.g., out of the canister 14.

The filter module 12 of the exemplary filter assembly 10 includes a cover 35 mounted to the housing 11, a flow tube 36 joined at one end to the cover 35, a filter unit 40 mounted to the other end of the flow tube 36, a barrier flange 41 joined to the flow tube 36 intermediate the ends of the flow tube 36, and a relief valve assembly 42 associated with the flow tube 36 between the barrier flange 41 and the filter unit 40.

The cover 35 has a generally bowl-shaped configuration comprising a base 43 and an annular rim 44 projecting from the base 43. For mounting the cover 35 to the head 13, threads in the external surface of the rim 44 mate with threads in the head 13 disposed at the end of the aperture 15 opposite the canister 14. To seal the cover 35 to the head 13, a flange 45 projects outward from the rim 44. An annular surface on the head 13 faces the flange 45 and a groove in the annular surface contains an O-ring 46 which is compressed by the flange 45 as the cover 35 is tightened onto the head 13.

In accordance with one aspect of he invention, the cover 35 includes a fulcrum, such as a central post 49, on the base 43 and several purchases, such as lugs 50, distributed about the rim 44. The post 49 projects from the base 43 in the same direction as the rim 44 while the lugs 50 protrude inwardly from, and are spaced evenly around, the internal surface of the rim 44. To provide a low profile, neither the post 49 nor the lugs 50 extend beyond the plane defined by the outer surface 51 of the flange 45. As shown in FIG. 2, the cross-section of the post may comprise an equilateral hexagon and the number of lugs 50 may equal the number of sides of the hexagon, i.e., six. Further, each lug 50 may have first and second surfaces 52, 53 which define planes that extend generally parallel past first and second corresponding surfaces 54, 55 of the post 49.

With this arrangement, the cover 35 may be conveniently and effectively tightened to or loosened from the head 13 by a simple lever, such as a screwdriver (not shown). The blade of the screwdriver may be placed against one surface 52, 53 of the lug 50, which provides a purchase for the lever, while the shaft of the screwdriver is placed against the corresponding surface 54, 55 of the post 49, which serves as a fulcrum for the lever. The shaft of the screwdriver is then forced against the post 49, rotating the cover 35. The hexagonal post 49 and the six lugs 50 also conveniently allow incremental rotation of the cover 35 in close, cramped quarters. Further, the hexagonal post 49 may conveniently serve as a head for a socket wrench (not shown). However, while the hexagonal post 49 and six lugs 50 are particularly advantageous, other arrangements may prove suitable. For example, more or fewer lugs and post surfaces, a fulcrum post with a circular cross-section, or slots in the rim in place of lugs may be utilized.

The flow tube 36 is preferably joined to the cover 35 by a rotary joint. In the exemplary filter assembly 10, a circular boss 56 projects centrally from the base 43 of the cover 35 and includes a peripheral groove 59. A retaining ring 60 spans the peripheral groove 59 in the boss 56 and an internal groove 61 at one end of the flow tube 36, creating the rotary joint between the flow tube 36 and the cover 35. Immediately below the boss 56, the flow tube 36 contains several orifices 62 which serve as inlet apertures.

From the cover 35, the flow tube 36 extends coaxially through the aperture 15 in the head 13 into the cylindrical canister 14, terminating at an adapter cup 63. Coaxially mounted to the end of the flow tube 36, the adapter cup 63 comprises a cylindrical side wall 64 and a flange 65. The flange 65 extends inwardly from one end of the side wall 64 and is joined to the end of the flow tube 36, for example, by swaging. Near the other end of the side wall 64, an inwardly directed rim 66 extends circumferentially about the side wall 64.

The filter unit 40 includes an end closure 70 which mates with the adapter cup 63, a blind end cap 71, and a filter element 72 and perforated cage 73 disposed between the end closure 70 and the blind end cap 71. In accordance with another aspect of the invention, the end closure 70 has a perimeter seal, such as an O-ring assembly 74, which sealingly engages the side wall 64 of the adapter cup 63. However, the O-ring assembly 74 remains free to slide between the limits of the flange 65 and the rim 66, defining a gap 75 between the flange 65, the side wall 64 and the end closure 70.

The filter element 72 has a hollow, generally cylindrical configuration, the interior of the filter element 72 communicating with the flow tube 36 via an aperture 76 in the end closure 70. Any of several suitably porous filter media may be utilized in fashioning the filter element 72 including, for example, any of several porous membranes or fibrous structures. The filter medium of the exemplary filter assembly 10 may comprise, for example, a porous fibrous medium available from Pall Corporation under the trademark ULTIPOR II and is preferably fashioned in a plurality of axially aligned pleats.

Figure 3A:
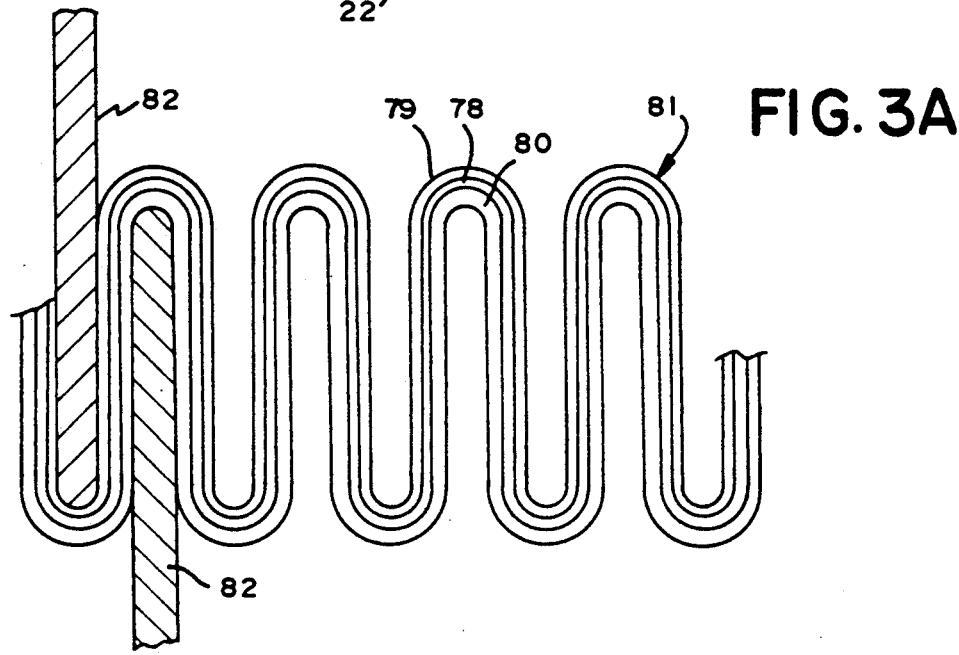
FIGS. 3A-3D illustrate a process for fabricating the filter element of the exemplary filter assembly of FIG. 1.

In accordance with a further aspect of the invention, the filter element 72 may be fabricated according to a process which yields a pleated configuration that maintains its integrity and effectiveness even at high differential pressures. In accordance with this process, the filter medium 78 is initially brought into contact with a support medium 79, such as an epoxy-coated steel mesh, and a filler 80, for example, by overlaying the support medium 79, the filter medium 78, and the filler 80, to form a laminate 81, as shown in FIG. 3A. Many suitably foldable materials may be utilized as the filler, including, for example, many types of paper.

Figure 3B:
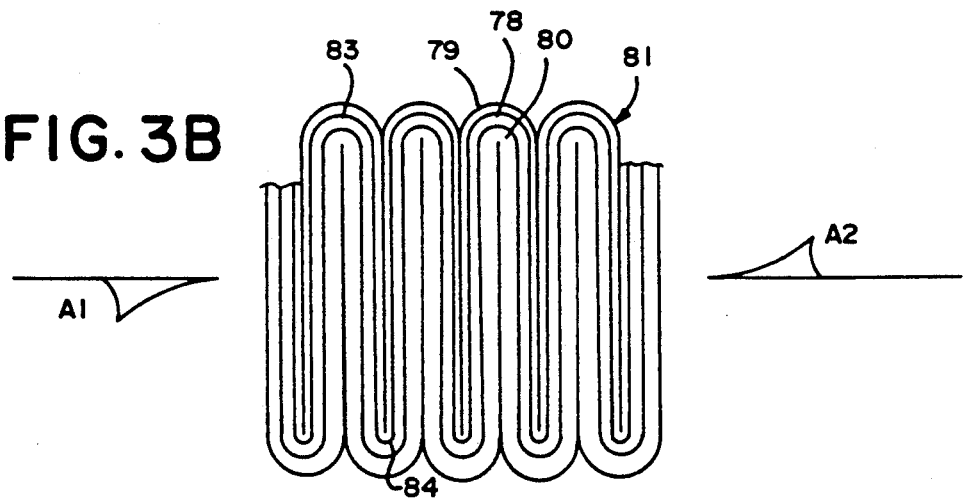
Figure 3C:
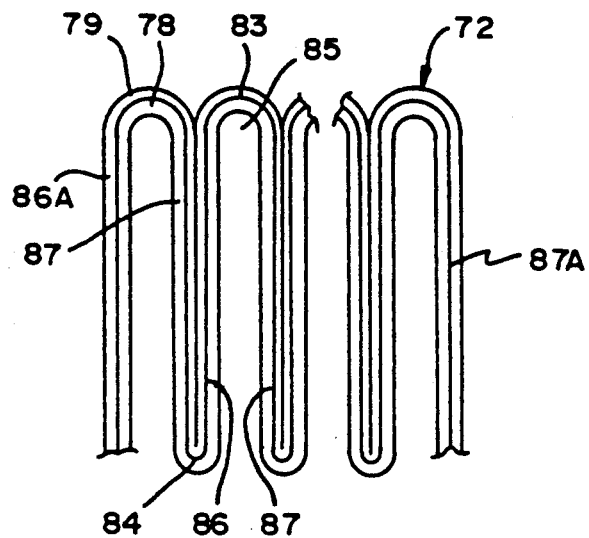

The laminate 81 is then pleated in any conventional manner, for example, by means of the pleater blades 82, as shown in FIG. 3A, and the pleats of the laminate 81 are compressed in a direction normal to the lines of the pleats, i.e., in the direction indicated by the arrows A1, A2 in FIG. 3B. By compressing the pleated laminate 81, the portion of the laminate 81 formed by the filter medium 78 and support medium 79 is formed with alternating loose folds 83 and tight folds 84. As shown in FIG. 3C, each loose fold 83 defines a generally U-shaped groove 85 having first and second webs 86, 87 spaced from one another by about twice the thickness of the compressed filler 80. The first web 86 of each groove 85 adjoins the second web 87 of the adjacent groove 85 with the tight fold 84 interconnecting the adjoining webs.

Figure 3D:
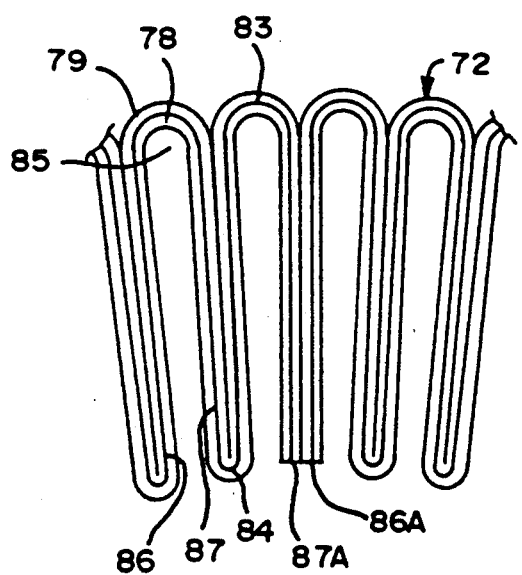

Once the pleats of the laminate 81 have been compressed, the filler 80 may be separated from the filter medium 78 and support medium 79 to yield the filter element 72, as shown in FIG. 3C. The initial first web 86A may then be fixedly joined, e.g., by adhesive, to the final second web 87A to form the hollow, cylindrical configuration of the filter element 72, as shown in FIG. 3D. The plurality of adjoining first and second webs 86, 87 and interconnecting tight folds 84 provides considerably strength and sufficient integrity for resisting the forces associated with large differential pressures across the filter element 72. Consequently, the initial and final webs 86A, 87A may be joined so the tight folds 84 are disposed downstream from the loose folds 83 of the filter element 72. For example, if the filter element 72 is designed for inside-out flow, the initial and final webs 86A, 87A are joined so the tight folds 84 define the inside diameter of the filter element 72 while the loose folds 83 define the outside diameter, as shown in FIG. 3D. Similarly, if the filter element 72 is designed for outside-to-inside flow, the initial and final webs 86A, 87A may be joined so the tight folds 84 define the outside diameter while the loose folds 83 define the inside diameter.

The filter element 72 is preferably disposed within and circumjacent the cylindrical perforated cage 73.

The cage 73, which may be fashioned from a suitably rigid metallic or polymeric material, such as cold-rolled steel, provides downstream support for the filter element 72. A perforated inner core (not shown) may be disposed within and circumjacent the filter element 72 to provide additional support. The ends of the cage 73 and, in particular, the filter element 72 are preferably positively sealed to the end closure 70 and the end cap 71, for example, by plastisol resin.

The barrier flange 41 is mounted about the flow tube 36 between the filter unit 40 at one end and the cover 35 at the other end. The barrier flange 41 preferably has a generally annular configuration and may be fabricated from any suitably rigid, impervious material, including, for example, cold-rolled steel. Spanning the distance between the flow tube 36 and the head 13, the barrier flange 41 separates the upstream portion of the housing 11 from the downstream portion. The edge of the barrier flange 41 presses against an O-ring 90 disposed within a groove 91 in the head 13 at the opposite end of the aperture 15 from the cover 35, maintaining a seal between the upstream and downstream portions.

To positively maintain the barrier flange 41 in position on the flow tube 36 and within the housing 11, the flow tube 36 includes peripheral grooves 92 disposed on either side of the barrier flange 41. Retaining rings 93 fitted into these grooves 92 extend a distance radially beyond the flow tube 36 along the upstream and downstream surfaces 94, 95 of the barrier flange 41. Sandwiched between the retaining rings 93, the barrier flange 41 is free to rotate about, but is constrained to move axially with, the flow tube 36.

Seated against the downstream surface 95 of the barrier flange 41, the coaxial relief valve assembly 42 is mounted about the flow tube 36. While differently configured relief valve assemblies may prove effective, the coaxial relief valve assembly 42 of the exemplary filter assembly 10 is particularly advantageous because it obviates the need for a seal between the barrier flange and the flow tube 36. The coaxial relief valve assembly 42 includes a sleeve 96 mounted closely about the flow tube 36 and formed with an L-shaped flange 100 at one end. Capable of sliding along the flow tube 36, the sleeve 96 is biased into a seated position with the lip 101 of the L-shaped flange 100 against the downstream surface 95 of the barrier flange 41 by a spring 102 which extends between the base 103 of the L-shaped flange 100 and the flange 65 of the adapter cup 63. Relief apertures 104 in the flow tube 36 below the barrier flange 41 enable communication between the interior of the flow tube 36 and the annular chamber formed by the seated L-shaped flange 100. An O-ring 105 disposed in an external circumferential groove 106 in the flow tube 36 below the relief apertures 104 provides a seal between the flow tube 36 and the sleeve 96.

In the preferred mode of operation, fluid to be filtered is directed through one or more of the primary, secondary or tertiary inlet ports 20-22 of the head 13 into the aperture 15. The flow then passes through the inlet orifices 62 of the flow tube 36, along the flow tube 36, and into the interior of the filter unit 40 via the aperture 76 in the end closure 70.

In accordance with a further aspect of the invention, as the fluid flows through the flow tube 36, it fills the gap 75 between the adapter cup 63 and the filter unit 40. Since the higher pressure inlet fluid bears against the entire annular surface of the end closure 70 facing the gap 75 but against only a portion of the surface of the end closure 70 facing the filter element 72, a net force is exerted downwardly against the end closure 70. This net force presses the filter unit 40 against the support plate 32, the O-ring assembly 74 sliding along the side wall 64 of the adapter cup 63, and forces the end closure 70 and the end cap 71 against the filter element 72 Thus, the end closure 70 and the end cap 71 are prevented from separating from the filter element 72 due to axially outwardly directed forces which normally act on the end closure and end cap of many conventional inside-out flow filter units. Further, this net force minimizes any motion and damps any vibration of the filter unit 40 which might otherwise occur due to pressure disturbances.

From the interior of the filter unit 40, the fluid flows through the filter element 72, where contaminants are deposited on the inside surface of the filter element 72 and through the perforated cage 73 into the canister 14. The filtered fluid then exits the canister 14 through the check valve assembly 34.

As fluid continually passes through the filter unit 40, particulates accumulate on the inside surface of the filter element 72, increasing the differential pressure across the filter element 72. This differential pressure is monitored by a conventional differential pressure device 107 via taps 110, 111 which communicate between the device 107 and upstream and downstream portions, respectively, of the housing 11 above and below the barrier flange 41. At a predetermined differential pressure, which corresponds to sufficient particulate accumulation to require replacement of the filter unit 40, the differential pressure device 107 provides a signal, for example, a visible red sleeve, to indicate that replacement is necessary.

In accordance with a further aspect of the invention, replacement of the filter unit 40 is exceedingly convenient. By simply unscrewing the cover 35 from the head 13, as previously outlined, the entire filter module 12 is jacked from the housing 11. The cover 35 has a sufficiently long run of thread that once the cover 35 is completely unscrewed from the head 13( the barrier flange 41 has completely disengaged from the O-ring seal 90 in the housing 11. The entire filter module 12 may then simply be withdrawn from the housing 11 through the aperture 15. The engagement between the rim 66 of the adapter cup 63 and the O-ring assembly 74 of the end closure 70 is sufficiently tight that the filter unit 40 is withdrawn from the housing 11 along with the other elements of the filter module 12. All of the contaminants filtered by the filter element 72 remain trapped within the interior of the filter unit 40, minimizing the possibility of re-contaminating the filtered fluid.

To remove the filter unit 40 from the adapter cup 63, the filter unit 40 is simply tilted at a slight angle, for example, about 7 degrees, from the axis of the filter module 12. This forces the O-ring seal assembly 74 of the end closure 70 over the rim 66 of the adapter cup 63 and allows the filter unit 40 to be discarded. A new filter unit 40 may then be inserted into the adapter cup 63 in an analogous manner and the entire filter module 12 may be reinserted into the housing 11 through the aperture 15. Once the threads on the cover 35 engage the threads of the head 13, the cover 35 is screwed onto the head 13 as previously outlined. This jacks the barrier flange 41 into engagement with the O-ring seal 90 and forces the filter unit 40 along the guide members 33 onto the support plate 32.

When the filter unit 40 is plugged or during periods of cold start, the relief valve assembly 42 provides a bypass around the filter unit 40. As the differential pressure increases, the pressure of the inlet fluid bearing on the base 103 of the L-shaped flange 100 becomes sufficiently greater than the pressure of the outlet fluid bearing on the base 103 that the sleeve 96 is forced away from the barrier flange 41 against the bias of the spring 102. This unseats the L-shaped flange 100 from the barrier flange 41, allowing the inlet fluid to bypass the filter unit 40 via the relief apertures 104 in the flow tube 36.

Although the present invention has been described in terms of one exemplary embodiment, it is not limited to that embodiment. Alternative embodiments and modifications which would still be encompassed by the invention may be made by those skilled in the art, particularly in light of the foregoing teachings. Therefore, the following claims are intended to cover any alternative embodiments, modifications or equivalents which may included within the spirit and scope of the invention.

I claim:

1. A filter assembly comprising:
   a housing which has an opening;
   a cover which is detachably and sealingly mounted to the housing at one end of the opening;
   a barrier flange which is detachably and sealingly mounted to the housing within the opening and which has upstream and downstream sides and an aperture extending therebetween, said housing including at least one port which communicates with the opening between the cover and the barrier flange;
   a flow tube which has first and second end means, which is joined at the first end means to the cover and extends through the aperture in the barrier flange, and which includes at least one orifice between the barrier flange and the cover, said barrier flange being joined to the flow tube; and
   a filter unit which is mounted to the second end means of the flow tube and which includes a hollow, cylindrical filter element and first and second impervious end means for capping the filter element, said flow tube communicating with the interior of the filter element via an aperture in the first end means of the filter unit;
   wherein the cover, barrier flange and filter unit are coaxially joined to the flow tube and wherein the barrier flange is no larger than the cover and the filter unit is no larger than the barrier flange, whereby the filter unit may be withdrawn through the opening by removing the cover from the housing.

2. The filter assembly of claim 1 wherein the cover is threaded to the housing and the barrier flange frictionally engages an elastomeric seal disposed between the barrier flange and the housing and wherein the cover is rotatably joined to the flow tube whereby the barrier flange may be jacked from engagement with the elastomeric seal by unscrewing the cover from the housing.

3. The filter assembly of claim 1 further comprising a differential pressure transducer mounted to the housing, said housing including a first tap communicating between the transducer and the opening upstream from the barrier flange and a second fluid tap communicating between the transducer and the opening downstream from the barrier flange.

4. The filter assembly of claim 1 wherein the second end means of the flow tube includes an adapter cup comprising a cylindrical side wall, a flange extending inwardly from one end of the side wall and being joined to the flow tube, an inwardly directed rim formed in the side wall proximate the other end, and wherein the first end means of the filter unit includes sealing means slidably engaging the interior of the side wall of the adapter cup for directing fluid between the flow tube and the interior of the filter unit, said sealing means being displaceable between the flange and the rim.

5. The filter assembly of claim 1 wherein the filter unit is releasably mounted to the flow tube.

6. The filter assembly of claim 1 wherein the housing includes a head and a hollow cylindrical casing having a first end means mounted to the head, said opening extending through the head.

7. The filter assembly of claim 1 wherein the aperture in the first end means of the filter unit comprises a fluid inlet into the filter unit.

8. A filter assembly comprising:
   a housing which has an opening;
   a cover which is detachably and sealingly mounted to the housing at one end of the opening;
   a barrier flange which is detachably and sealingly mounted to the housing within the opening and which has upstream and downstream sides and an aperture extending therebetween, said housing including at least one port which communicates with the opening between the cover and the barrier flange;
   a flow tube which has first and second end means, which is joined at the first end means to the cover and extends through the aperture in the barrier flange, and which includes at least one orifice between the barrier flange and the cover, said barrier flange being joined to the flow tube;
   a filter unit which is mounted to the second end means of the flow tube and which includes a hollow, cylindrical filter element and first and second impervious end means for capping the filter element, said flow tube communicating with the interior of the filter element via an aperture in the first end means of the filter unit; and
   a relief valve mounted to the flow tube between the barrier flange and the filter unit.

9. The filter assembly of claim 8 wherein the flow tube includes relief ports between the barrier plate and the second end means of the flow tube and wherein the relief valve comprises a coaxial sleeve mounted about the flow tube proximate the relief ports, said sleeve including a seating end, and means for biasing the seating end of the sleeve against the downstream side of the barrier flange.

10. A filter assembly comprising:
    a housing which has an opening, a head, and a hollow cylindrical casing having a first end means mounted to the head, said opening extending through the head;
    a cover which is detachably and sealingly mounted to the head at one end of the opening, the casing being mounted to the head at the opening;
    a barrier flange which is detachably and sealingly mounted to the head within the opening between the cover and the casing and which has upstream and downstream sides and an aperture extending therebetween, said housing including at least one port which communicates with the opening between the cover and the barrier flange;

a flow tube which has first and second end means, which is joined at the first end means to the cover and extends through the aperture in the barrier flange, and which includes at least one orifice between the barrier flange and the cover, said barrier flange being joined to the flow tube; and a filter unit which is disposed within the casing and mounted to the second end means of the flow tube and which includes a hollow, cylindrical filter element and first and second impervious end means for capping the filter element, said flow tube communicating with the interior of the filter element via an aperture in the first end means of the filter unit.

11. The filter assembly of claim 10 wherein the casing includes a stop means for securing the filter unit within the casing.

12. The filter assembly of claim 11 wherein the casing includes means for guiding the filter unit onto the stop means.

13. The filter assembly of claim 10 wherein the casing includes a second end means comprising a check valve assembly.

14. A filter unit for removing one or more substances from a fluid flowing therethrough, said filter unit comprising:

a hollow, cylindrical filter element including a porous filter medium comprising a plurality of adjacent, self-supporting, axially-aligned pleats, each pleat having a generally U-shaped groove including a loose fold and two webs extending from the loose fold and terminating in an open end, and the plurality of pleats being arranged with one web of each pleat adjoining one web of an adjacent pleat, said adjoining webs joined by a tight fold, and with the open ends of the pleats disposed upstream from the loose folds of the pleats;

a perforated support disposed adjacent the pleated filter medium downstream from the loose folds;

first and second end means for capping the ends of the filter element, said first end means including an aperture communicating with the interior of the filter element.

15. The filter unit of claim 14 wherein the aperture in the first end means comprises an inlet and the open ends of the pleats are disposed radially inwardly from the first folds.

16. The filter unit of claim 15 wherein the perforated support comprises a cylindrical cage disposed radially outwardly from and adjoining the first folds of the pleats.

17. The filter unit of claim 16 wherein the adjoining webs of adjacent pleats are self-supporting.

18. A filter assembly cover removably mountable to a housing, said cover comprising:

a body including a base and an annular rim having internal and external surfaces, said annular rim extending in a first direction from the base and terminating in an outer edge which defines a first plane;

fulcrum means disposed coaxially within the rim, said fulcrum means extending in the first direction from the base;

purchase means including a predetermined number of protrusions which extend from and are evenly distributed about the internal surface of the rim below the first plane; and threaded means operatively associated with the body for joining the cover to the housing.

19. The filter assembly cover of claim 1 wherein the fulcrum comprises a protrusion having a cross-section comprising an equilateral polygon with a number of sides equal to the number of protrusions, said protrusions extending no further than the first plane.

20. The filter assembly cover of claim 19 wherein the number of protrusions is six and the equilateral polygon comprises an equilateral hexagon.

21. The filter assembly cover of claim 18 wherein each protrusion includes first and second surfaces defining second and third, planes, respectively, which extend generally parallel to the fulcrum means.

22. The filter assembly cover of claim 21 wherein the fulcrum means comprises a protrusion having a cross-section comprising an equilateral polygon with the number of sides equal to the number of protrusions and wherein the second and third planes extend generally parallel to first and second sides of the protrusions.

23. The filter assembly cover of claim 18 wherein the threaded means includes threads disposed in the external surface of the rim.

24. The filter assembly cover of claim 23 wherein the annular rim includes a flange extending externally in the first plane.

25. A filter assembly for removing one or more substances from a fluid to be filtered, said filter assembly comprising:

a hollow, cylindrical filter element including a porous filter medium and having first and second ends;

an impervious end cap mounted to the first end of the filter element;

a support proximate the end cap;

means for enclosing the second end of the filter element, said enclosing means including means for defining an inlet aperture communicating with the interior of the hollow filter element; and means for channeling the fluid to be filtered through the aperture of the enclosing means into the interior of the hollow filter element, said enclosing means slidably engaging the channeling means and further including a first surface in contact with the fluid to be filtered facing away from the filter element and a second surface in contact with the fluid to be filtered facing toward the filter element, said first surface being larger than the second surface.

26. The filter assembly of claim 25 wherein the enclosing means includes an O-ring assembly slidably engaging the directing channeling means.

27. The filter assembly of claim 26 wherein the channeling directing means includes a cylindrical side wall, said O-ring assembly slidably engaging the side wall, and wherein the channeling means further includes an inwardly directed rim means formed in the side wall for providing a stop for the O-ring assembly.

28. The filter assembly of claim 27 wherein the O-ring assembly is detachably mounted within the side wall, said rim means being sized to allow the O-ring assembly to move through the rim means when the O-ring assembly is tilted at an angle.

* * * * *

UNITED STATES PATENT AND TRADEMARK OFFICE
CERTIFICATE OF CORRECTION

PATENT NO. : 5,006,235

DATED : April 9, 1991

INVENTOR(S) : Roydon B. Cooper

It is certified that error appears in the above-identified patent and that said Letters Patent is hereby corrected as shown below:

Column 12, line 7, change "1" to --18--;

line 17, after "third" delete ",";

line 54, delete "directing".

Signed and Sealed this

Twenty-second Day of September, 1992

Attest:

DOUGLAS B. COMER

*Attesting Officer*      *Acting Commissioner of Patents and Trademarks*